United States Patent
Chao et al.

(10) Patent No.: US 11,632,336 B2
(45) Date of Patent: Apr. 18, 2023

(54) MULTI-RADIO DEVICE

(71) Applicant: NXP USA, Inc., Austin, TX (US)

(72) Inventors: Yi-Ling Chao, Sunnyvale, CA (US);
Timothy J. Donovan, San Jose, CA (US); Yui Lin, Palo Alto, CA (US);
Hsun-Yao Jan, Cupertino, CA (US);
Yiqing Shen, Santa Clara, CA (US)

(73) Assignee: NXP USA, Inc., Austin, TX (US)

( * ) Notice: Subject to any disclaimer, the term of this patent is extended or adjusted under 35 U.S.C. 154(b) by 3 days.

(21) Appl. No.: 17/362,510

(22) Filed: Jun. 29, 2021

(65) Prior Publication Data
US 2022/0417167 A1 Dec. 29, 2022

(51) Int. Cl.
| | |
|---|---|
| *H04L 47/52* | (2022.01) |
| *H04W 72/12* | (2023.01) |
| *H04W 28/02* | (2009.01) |
| *H04W 56/00* | (2009.01) |

(52) U.S. Cl.
CPC ....... *H04L 47/524* (2013.01); *H04W 28/0268* (2013.01); *H04W 56/0005* (2013.01); *H04W 72/1247* (2013.01)

(58) Field of Classification Search
CPC ... H04L 47/50; H04L 47/524; H04L 47/6275; H04L 47/6285; H04L 47/805
See application file for complete search history.

(56) References Cited

U.S. PATENT DOCUMENTS

| | | | |
|---|---|---|---|
| 8,472,427 B1 | 6/2013 | Wheeler et al. | |
| 8,706,032 B2 | 4/2014 | Zhang et al. | |
| 8,824,966 B2 | 9/2014 | Boes | |
| 9,277,564 B2 | 3/2016 | Wang et al. | |
| 9,681,463 B2 | 6/2017 | Grushkevich et al. | |
| 2014/0226502 A1* | 8/2014 | Behnamfar | H04W 52/04 370/336 |
| 2016/0381692 A1* | 12/2016 | Hareuveni | H04W 28/0257 370/329 |
| 2018/0242339 A1* | 8/2018 | Choudhary | H04W 4/80 |
| 2019/0335482 A1* | 10/2019 | Yang | H04L 49/70 |
| 2020/0275318 A1* | 8/2020 | Kharvar | H04W 72/1215 |

FOREIGN PATENT DOCUMENTS

EP 3061299 B1 8/2014

OTHER PUBLICATIONS

Vishram, Mishra et al; "List Multi-Coloring Based Fair Channel Allocation Policy for Self Coexistence in Cognitive Radio Networks with QoS Provisioning"; IEEE Region 10 Symposium, IEEE Xplore; 6 pages (2014).

* cited by examiner

*Primary Examiner* — Pao Sinkantarakorn

(57) ABSTRACT

One example discloses a multi-radio device, including: a controller configured to be coupled to a radio; wherein the controller is configured to receive a request to communicate a signal with an initial communication priority from the radio; wherein the controller includes a priority offset module configured to, adjust the initial communication priority by a first offset; and wherein the controller includes a priority escalator module configured to, adjust the initial communication priority by a second offset.

19 Claims, 5 Drawing Sheets

MULTI-RADIO DEVICE

The present specification relates to systems, methods, apparatuses, devices, articles of manufacture and instructions for packet priority adjustment.

SUMMARY

According to an example embodiment, a multi-radio device, comprising: a controller configured to be coupled to a radio; wherein the controller is configured to receive a request to communicate a signal with an initial communication priority from the radio; wherein the controller includes a priority offset module configured to, adjust the initial communication priority by a first offset; and wherein the controller includes a priority escalator module configured to, adjust the initial communication priority by a second offset.

In another example embodiment, the radio is configured to set the initial communication priority based on a traffic type of the signal.

In another example embodiment, the traffic type is at least one of: real-time two-way voice data, audio recordings, real-time two-way video, video recordings, photos, images, device control, sensor data, electronic payment, and text.

In another example embodiment, the first offset for the radio is based on a number of prior requests to communicate that were granted, denied, or aborted within a predetermined time period.

In another example embodiment, if the number of prior requests that were granted and finished in the time period exceeds a preset threshold, then the priority offset module decrements the first offset.

In another example embodiment, if the number of prior requests that were denied or granted then aborted by arbiter in the time period exceeds a preset threshold, then the priority offset module increments the first offset.

In another example embodiment, if an accumulated medium airtime for the radio in a predetermined time period exceeds a preset threshold, then the priority offset module decrements the first offset; and the accumulated medium airtime includes a total time the radio is granted to communicate the signal and any other signals.

In another example embodiment, if an accumulated medium airtime in a predetermined time period falls below a preset threshold, then the priority offset module increments the first offset; and the accumulated medium airtime includes a total time the radio is granted to communicate the signal and any other signals.

In another example embodiment, the priority escalator module is configured to increase the second offset in response to the signal actually being communicated.

In another example embodiment, the controller is configured to receive from the radio a request to enable or disable the priority escalator module and the second offset.

In another example embodiment, the controller is configured to enable or disable the priority escalator module and the second offset during communication of the signal.

In another example embodiment, the controller is configured to separately enable or disable the priority escalator module for either transmitted or received communications.

In another example embodiment, the controller is configured to disable the priority escalator module if a packet error rate (PER) for the signal exceeds a predetermined PER.

In another example embodiment, the controller is configured to separately enable or disable the priority offset module.

In another example embodiment, the signal is a digital signal including a set of data-packets; and the first offset and the second offset are individually adjusted for each data-packet in the set of data-packets.

In another example embodiment, the radio is at least one of: a Wi-Fi radio, a Bluetooth radio, or a personal area network radio.

In another example embodiment, the multi-radio device and the radio are embedded in a single multi-radio chip.

In another example embodiment, the controller is further configured to be coupled to a second radio; the controller is configured to receive a request to communicate a second signal with a second communication priority from the second radio; the priority offset module is configured to, adjust the second communication priority by a third offset; the priority escalator module is configured to, adjust the second communication priority by a fourth offset; and the second radio is configured to set the second communication priority based on a second traffic type.

According to an example embodiment, a method of enabling a multi-radio device to be operated, comprising: distributing a set of instructions, stored on a non-transitory, tangible computer readable storage medium, for configuring the multi-radio device; wherein the multi-radio device includes a priority offset module and a priority escalator module, and is configured to be coupled to a radio; wherein the instructions include: receiving a request to communicate a signal with an initial communication priority from the radio; adjusting the initial communication priority by a first offset with the priority offset module; and adjusting the initial communication priority by a second offset with the priority escalator module.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
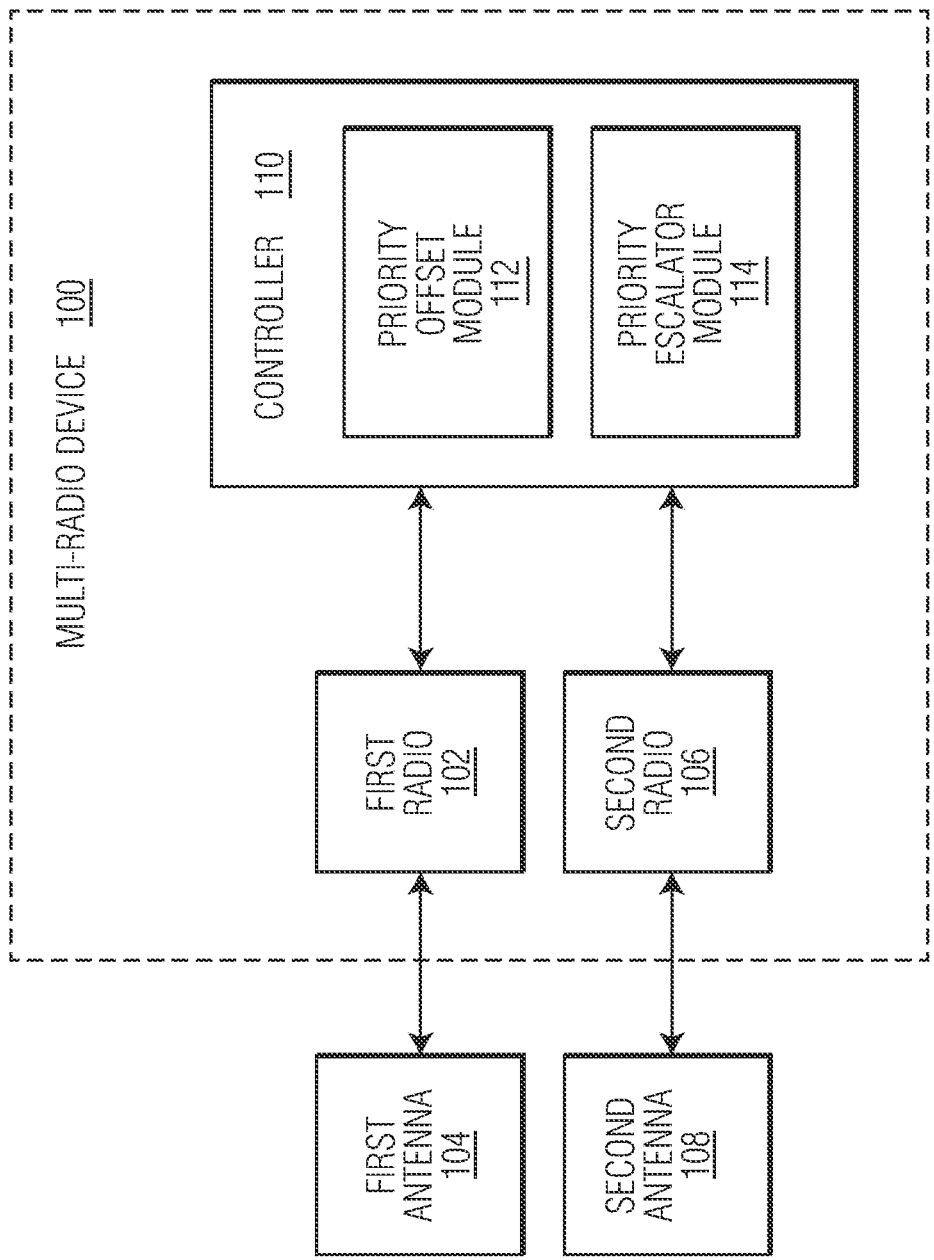
FIG. 1 is a first example of a multi-radio device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Radios (e.g. Wi-Fi, Bluetooth (BT), personal area network (802.15.4, PAN, Zigbee), cellular, etc.), either connected as a system or in multi-radio chips, have their own data paths and RF radios where simultaneous operations can occur on a single or separate antennas. Some radios can schedule their own traffic; however, due to the varying traffic types among coexisting radios, more than one radio might request that their traffic be transmitted/received at a same time.

When multiple radios are attempting to access a same/nearby band (e.g. 2.4 GHz, 5 GHz, etc.) and/or channel they can interfere each other and result in unacceptable quality of service. Thus an arbitration process must decide which radio operates when.

In order to resolve the conflicts between radios, a priority-based arbitration scheme can be adopted. For example, a set of radios can send requests to operate to an arbitration device (e.g. arbiter) and ask for communications medium access when the radio has traffic to operate. Often more than one radio request to operate during overlapping time periods and a medium access conflict results. In response the arbiter decides which radio has a current right to access the communications medium based a traffic type the radio wants to operate. Example traffic types include: voice, video, email, and photos/images. Each traffic type has a fixed transmit/receive priority based for example on: a traffic characteristic, a time sensitivity, an impact on the network operations, etc.

Even though, Bluetooth is a frequency hopping system and has schedule-based traffic, and Wi-Fi and 802.15.4 have a mechanism to support channel change when the condition of the operating channel's condition worsens, they all operate in a fixed channel/band for a long period of time and such arbiter operation as described above, can often result in certain traffic types (e.g. traffic assigned a lower priority) being delayed for a noticeable long period of time that reduces an optimal user experience. Often the lower priority traffic barely has a chance to operate under heavy high priority traffic.

Now discussed is a multi-radio device for dynamic per-packet priority adjustment mechanisms for a set of radios in a multi-radio chip/system to support fair communication medium access, communication medium utilization efficiency, and end-user experience optimization.

Example embodiments of the multi-radio device focus on balancing a medium efficiency and fairness to enhance an overall user experience. This is achieved in some examples by adding an adjustment on a requested priority based on the current traffic medium occupancy time and past arbitration statistics of each radio, such that there is no one radio which constantly has higher priority than others. The arbitrated traffic priority is adjusted per packet and continues through the whole transaction.

So while time sensitive traffic can still have a higher base/default priority than other non-time sensitive traffic, the non-time sensitive traffic can still win over the time sensitive traffic so as to optimize an overall user experience.

In some example embodiments, traffic priority is adjusted by the multi-radio device in real time. In addition, the adjustment may consider an overall interaction between traffic in all of the radios in the set, instead of each radio independently adjusting its priority based on its own performance criteria.

In some example embodiments, two traffic priority offsets are included on top of a default/base fixed traffic priority that was initially based on the traffic type.

FIG. 1 is a first example multi-radio device 100. The first example multi-radio device 100 includes a first radio 102 configured to be coupled to a first antenna 104, a second radio 106 configured to be coupled to a second antenna 108, and a controller 110. The controller 110 includes a priority offset module 112 configured to calculate a priority offset (O) and a priority escalator module 114 configured to calculate a priority escalator (E).

The radios 102, 106 can be: a Wi-Fi radio, a Bluetooth radio, or a personal area network radio. Other radios are also possible. In some example embodiments, of the multi-radio device 100 the radios are embedded in a single multi-radio chip.

The controller 110 is configured to be coupled to the first radio 102 that is configured to operate a first signal, and the second radio 106 that is configured to operate a second signal. The controller 110 is configured to modulate one or more information packets (e.g. communications, beacons, data, management, etc.) in the first and second signals. Examples of modulate include adjusting a parameter/attribute of a packet (e.g. power level, priority level, etc.), aborting a current transmission of a packet, and not transmitting a packet.

Figure 2:
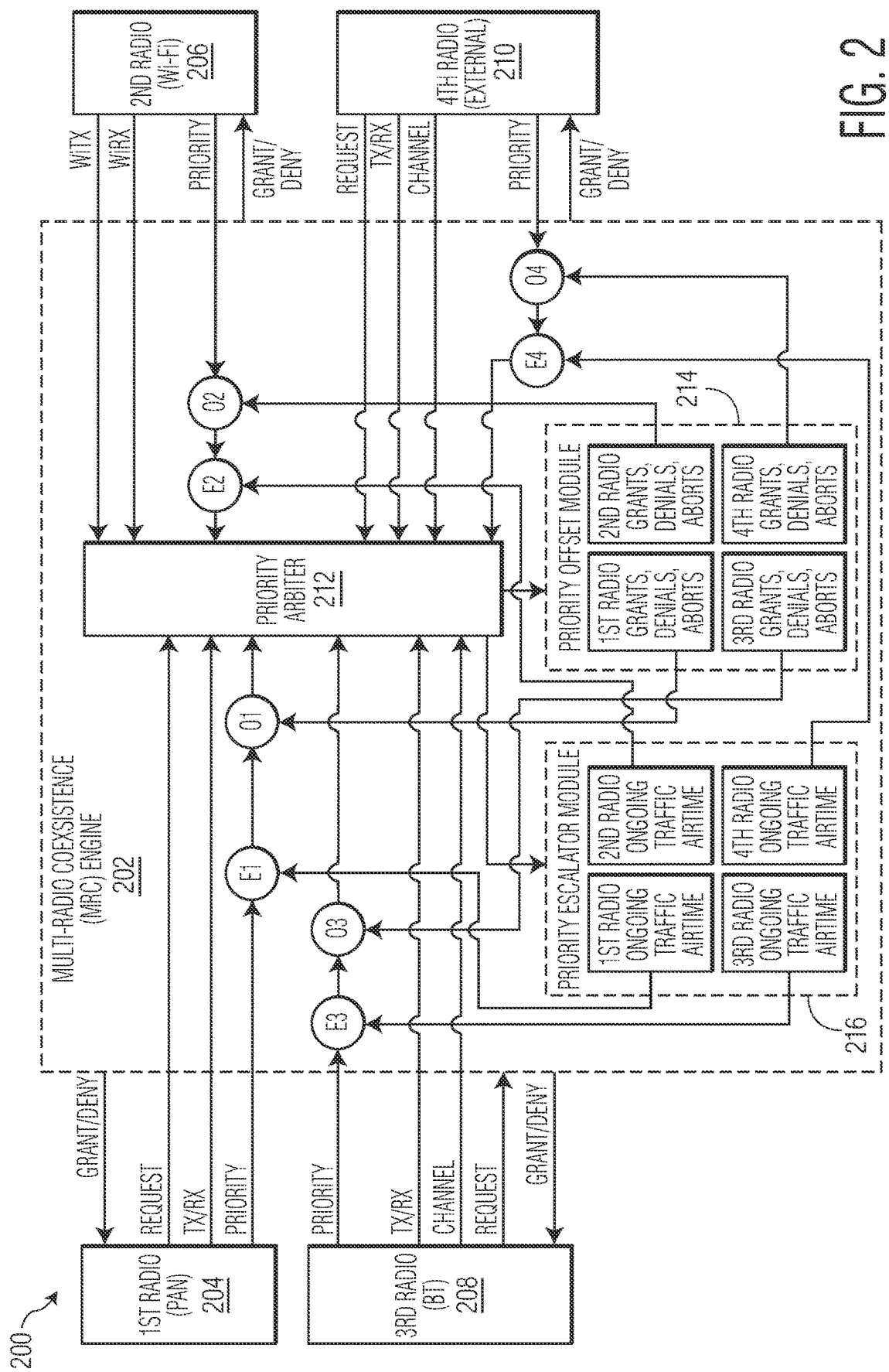
FIG. 2 is a second example of the multi-radio device.

The first radio 102 discussion that follows also applies to the second radio 106, as well as to a set of additional radios, such as shown in FIG. 2.

Next the controller 110 is configured to receive a request to communicate a signal with an initial communication priority from the first radio 102. The communication priority (e.g. a digital number) is initially set to the initial (e.g. base/default) communication priority from the radio 102.

The first radio 102 is configured to set the initial communication priority based on a traffic type of the signal. The traffic type is at least one of: real-time two-way voice data, audio recordings, real-time two-way video, video recordings, photos, images, device control, sensor data, electronic payment, and text.

The priority offset module 112 is configured to, adjust the initial communication priority from the first radio 102 by a first offset (e.g. priority offset (O1)). The priority escalator module 114 is configured to, adjust the initial communication priority by a second offset (e.g. priority escalator (E1)). In some example embodiments, the signal is a digital signal including a set of data-packets, and the first offset and the second offset are individually adjusted for each data-packet in the set of data-packets.

The controller 110 collects a set of statistics on each radio 102, 106 regarding a number of traffic communication grants, denials, and aborts, as well as a total time used by each radio, and a total time wasted by each radio (i.e., where radio aborts its signal (e.g. traffic) communication traffic before the signal is completely communicated (e.g. finished).

The first offset (e.g. priority offset (O)) for the first radio 102 is a function of a number of grants, denials, and/or aborts within a predetermined time period for each radio.

For example, in some example embodiments, if the number of prior requests that were granted and finished in the time period exceeds a preset threshold, then the priority offset module 112 decrements the first offset. If the number of prior requests that were denied or granted then aborted by arbiter in the time period exceeds a preset threshold, then the priority offset module 112 increments the first offset.

The first offset for the first radio 102 can also be a function of an accumulated communications-medium airtime for the first radio 102 within a predetermined time period. The accumulated medium airtime includes a total time the first radio 102 is granted to communicate the signal and any other signals.

For example, if the accumulated medium airtime for the first radio 102 in the predetermined time period exceeds a preset threshold, then the priority offset module 112 decrements the first offset. If the accumulated medium airtime in a predetermined time period falls below a preset threshold, then the priority offset module 112 increments the second offset.

The priority offset (O) can be re-initialized/reset to a predetermined value (e.g. zero) at a beginning of each predetermined time period. The controller 110 can also be configured to receive from the first radio 102 a request to enable or disable the priority offset module 112 either before or during (e.g. in real-time) a granted signal transmission.

The second offset (e.g. priority escalator (E)) for the first radio 102 can be a function of an accumulated communications-medium airtime within a transaction for the first radio 102.

In some example embodiments, the priority escalator module 114 is configured to further increase the second offset in response to the signal actually being communicated. In other words, in some example embodiments the priority escalator offset (E) value of an ongoing granted request is automatically increased with time as the radio's communication signal (e.g. traffic packets) continues to be communicated, thereby ensuring a complete communication with the radio.

The controller 110 can also be configured to receive from the first radio 102 a request to enable or disable the priority escalator module 114 either before or during (e.g. in real-time) a granted signal transmission. The controller 110 can be configured to separately enable or disable the priority escalator module 114 for either transmitted or received communications.

In some example embodiments, the controller 110 is configured to disable the priority escalator module 114 if a packet error rate (PER) for the signal exceeds a predetermined PER. For example, if a radio notices that a packet error rate for a communication is exceeding a predetermined level, the radio may disable the priority escalator offset (E) contribution to the communication's overall communication priority.

The above discussion with respect to the first radio 102 also applies to the second radio 106. For example, the controller 110 is configured to receive a request to communicate a second signal with a second communication priority from the second radio 106. The priority offset module 112 is then configured to, adjust the second communication priority by a third offset and the priority escalator module 114 is configured to, adjust the second communication priority by a fourth offset.

FIG. 2 is a second example multi-radio device 200. The second example multi-radio device 200 includes a multi-radio coexistence engine (MRC) 202, a first radio 204 (e.g. PAN-IEEE 802.15.4 radio), a second radio 206 (e.g. BT radio), a third radio 208 (e.g. WiFi radio), and a fourth radio 210 (e.g. an External Radio). The MRC 202 includes a priority arbiter 212 (similar to the controller 110 in FIG. 1), a priority offset module 214 configure to calculate a set of priority offsets (O), a priority escalator module 216 configured to calculate a set of priority escalators (E), and a set of adders/summers specific to each of the radios 204, 206, 208, 210 (i.e. O1/E1, O2/E2, O3/E3, O4/E4) configured to combine each radio's 204, 206, 208, 210 base/default communication priority with the set of priority offsets (O) and set of priority escalators (E).

Various example interface signals exchanged between MRC 202 and each of the radios 204, 206, 208, 210 are also shown and include: requests for communication, type of communication (i.e. transmit or receive (TX/RX)), base/default communication priority, and grant or denial of the requested communication.

The priority arbiter 212 collects a set of statistics on each of the radios 204, 206, 208, 210 regarding a number of traffic communication grants, denials, and aborts, as well as an ongoing traffic air time used by each radio, and a total time wasted by each radio (i.e., where radio aborts its signal (e.g. traffic) communication traffic before the signal is completely communicated (e.g. finished).

Figure 3:
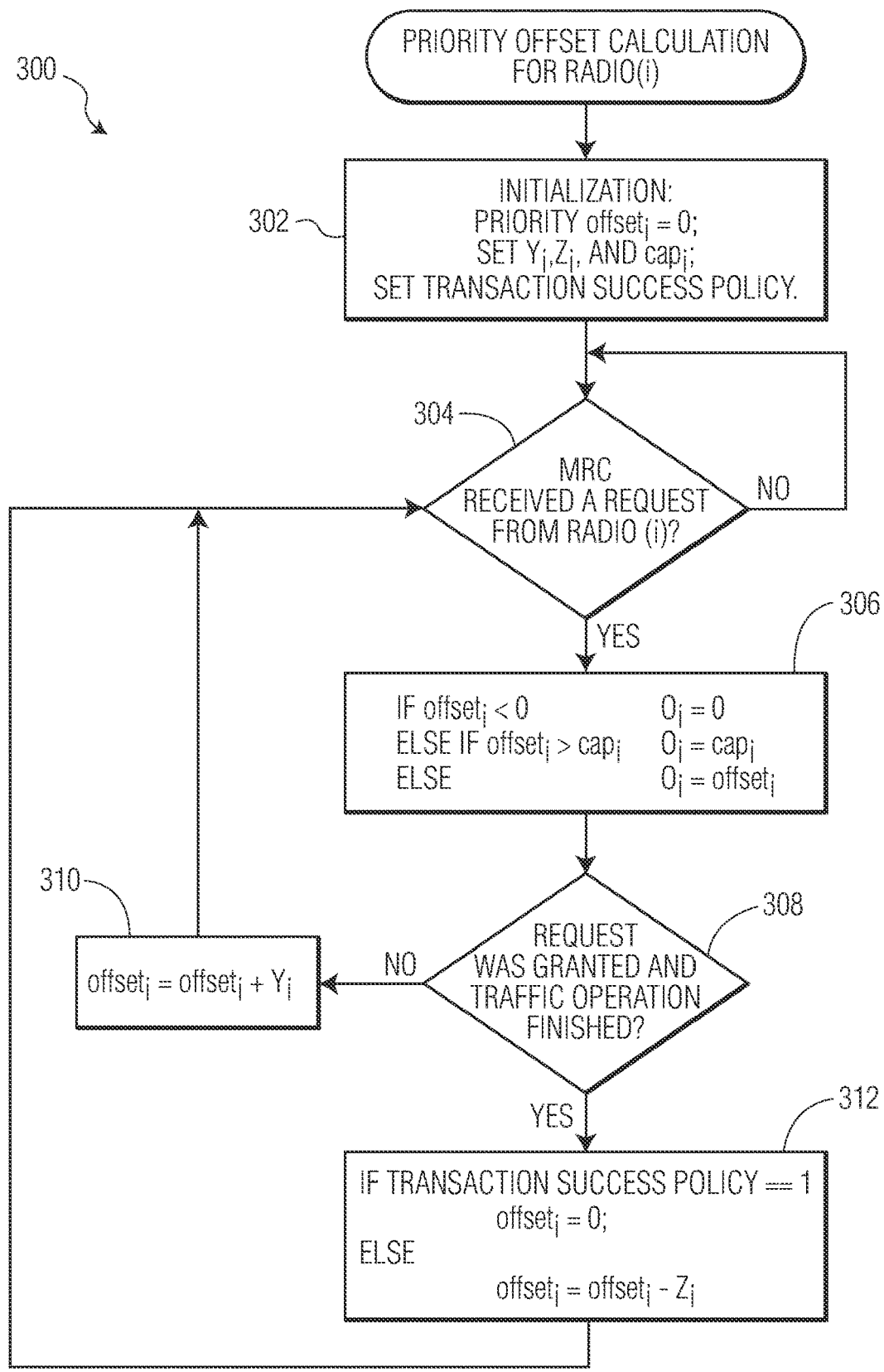
FIG. 3 is an example set of instructions for enabling a priority offset module within the multi-radio device.

FIG. 3 is an example 300 set of instructions for enabling the priority offset module 214 within the multi-radio device 200 in either software and/or hardware. The priority offset (O) for radio(i) is calculated by the priority offset module 214, where "i" is an integer number.

In step 302, initialize reset priority offset=0; set variables $Y_i$, $Z_i$, and $cap_i$ to initial values where $cap_i$ is the upper bound of the applied first offset for radio i; and set transaction success policy. In step 304, did the MRC 202 received a request to communicate from Radio(i)? In step 306 if $offset_i<0$ then $O_i=0$, else if $offset_i>cap_i$ then $O_i=cap_i$, else $O_i=offset_i$. In step 308, request was granted and traffic operation finished? In step 310, if no, then $offset_i=offset_i+Y_i$. In step 312, if yes, then if transaction success policy==1 set $offset_i=0$, else set $offset_i=offset_i-Z_i$.

In this example 300, the priority offset (O) increases by Y for an arbitration failure including no grant or traffic abort. Upon a successful transaction (i.e., arbitration grant until traffic finished) the priority offset (O) can decrease by Z or reset to 0, configured through a register. Y and Z are separately configured by registers and can be different for each radio to provide flexibility. Upon receiving a communication request and its corresponding traffic priority request (i.e., base priority), the controller 110 (e.g. arbiter) arbitrates by using the base priority level+O, where O=0, if offset<0, O=cap, if offset>cap, otherwise, O=offset.

Figure 4:
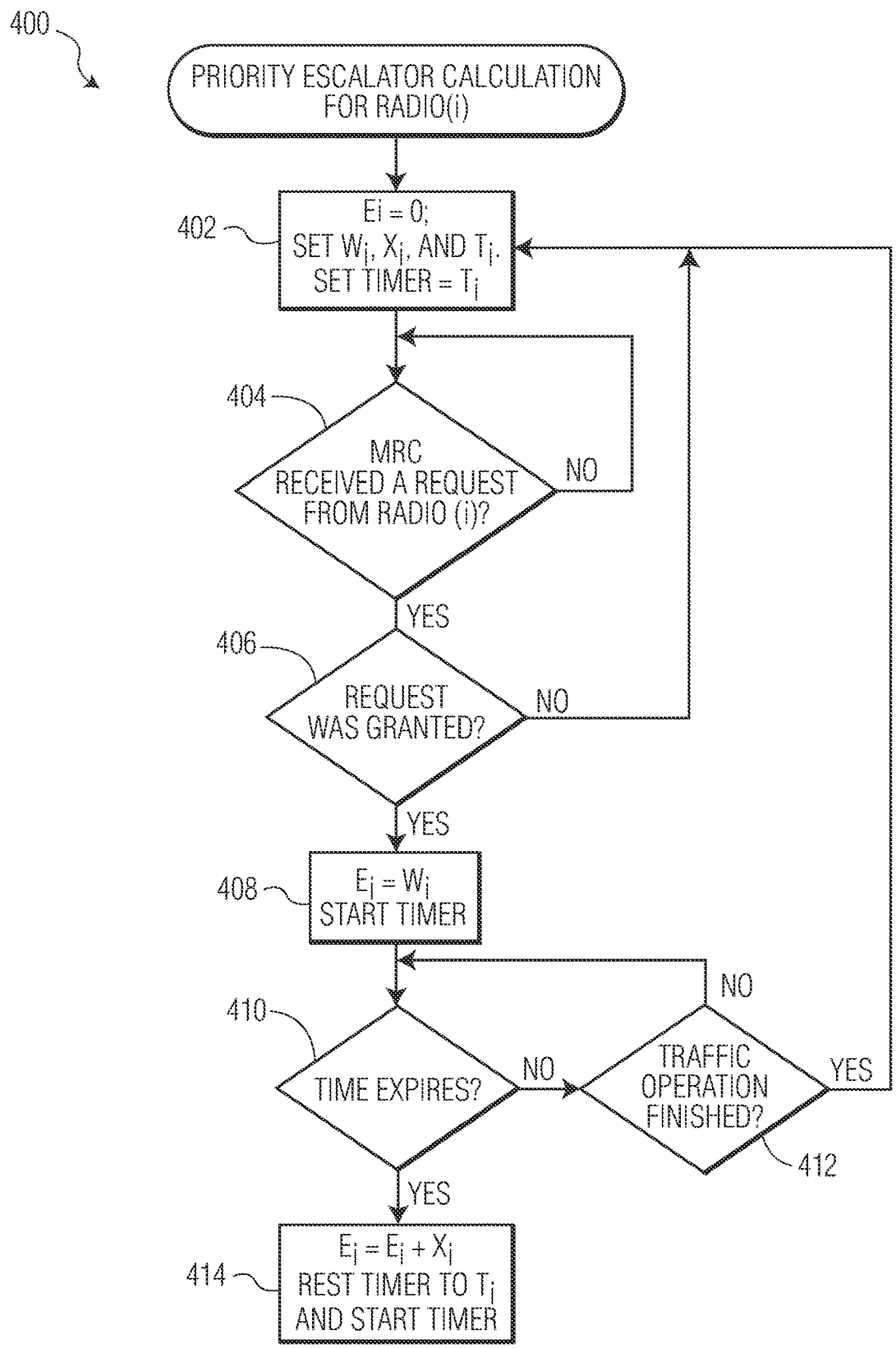
FIG. 4 is an example set of instructions for enabling a priority escalator module within the multi-radio device.

FIG. 4 is an example 400 set of instructions for enabling the priority escalator module 216 within the multi-radio device 200 in either software and/or hardware. The priority escalator (E) for radio(i) is calculated by the priority escalator module 216.

In step 402, initialize $E_i=0$; set $W_i$, $X_i$, and $T_i$; and set timer=$T_i$. In step 404, MRC 202 received a request from radio(i)? In step 406 was request granted? In step 408, if yes, set $E_i=W_i$ and start timer. In step 410, timer expires? In step 412, if no, traffic operation finished? In step 414, if yes, set $E_i=E_i+X_i$; reset timer to $T_i$; and start timer.

In this example 400 a traffic priority level is increased by W levels upon the grant. The ongoing traffic's priority level keeps increasing by X levels every T interval. W does not accumulate. If the winning radio continues to win at the re-arbitration due to a new request from a coexisting radio, W remains (e.g. does not increase to 2W). W is reset at the grant de-assertion, either due to an arbitration loss or transaction complete. The accumulation of Xs is also reset at the grant de-assertion.

Each radio in the multi-radio device 100, 200 can configure W, X and T separately to provided flexibility. For pair traffic, such as a BT frame, that includes Tx traffic and Rx traffic or a Wi-Fi and 802.15.4 data packet and the corresponding acknowledgement, W and the accumulation of X continue for the pair.

Figure 5:
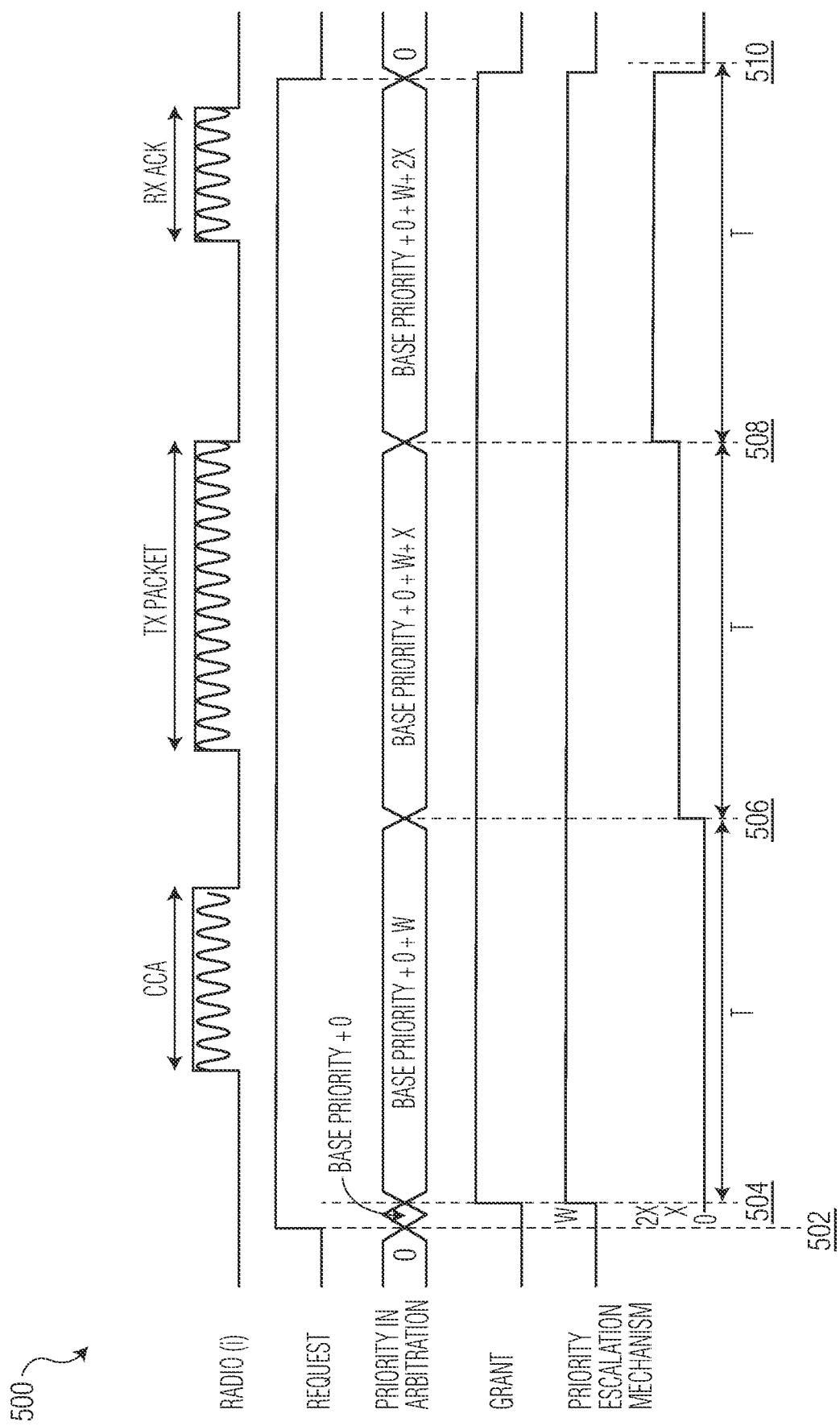
FIG. 5 is an example timing diagram of the multi-radio device managing communication priority.

FIG. 5 is an example 500 timing diagram of the multi-radio device 200 managing communication priority. In example 500 the multi-radio device 200 is managing the communication priority of radio(i) as discussed in FIGS. 4 and 5.

At time 502, the radio (i) submits a request to communicate at a base priority. The priority offset module calculates the first offset O hence the arbitrated priority base priority+O.

At time 504, the arbiter grants the request from radio (i) and the priority escalator module increases the arbitrated priority to base priority+O+W which is used to arbitrate against requests from other radios happening between time 504 and time 506.

At time 506, the priority escalator module increases the arbitrated priority to base priority+O+W+X after radio (i) operates for T interval. This priority is used to arbitrate against requests from other radios happening between time 510 and time 514.

At time 508, the priority escalator module increases the arbitrated priority to base priority+O+W+2X after radio (i) operates for 2T interval. This priority is used to arbitrate against requests from other radios happening between time 510 and time 518.

At time 510, radio (i) finishes its operation and de-asserts the request.

Various example embodiments of the multi-radio device 100, 200 are useful for preventing a Wi-Fi client stuck at low throughput when connected to an aggressive rate drop AP. For example, due to Bluetooth time sensitive traffic having higher priority, Wi-Fi Rx traffic might get stuck at low throughput due to not being able to receive correctly under Bluetooth interference and/or not being able to transmit (block) ack due to losing in arbitration to prevent causing interferent to Bluetooth traffic. Using the multi-radio device 100, 200, AP dropping rate to very low can be prevented because Wi-Fi can still have chances to have interference free receiving and (block) ack transmission even when traffic collisions happen.

Regarding the instructions 300, 400 discussed above, various combinations of hardware, software and cloud services can host these instructions. Such systems can include an input/output data interface, a processor, a storage device, and a non-transitory machine-readable storage medium. The machine-readable storage medium includes the instructions which control how the processor receives input data and transforms the input data into output data, using data within the storage device. The machine-readable storage medium in an alternate example embodiment is a non-transitory computer-readable storage medium. In other example embodiments the set of instructions described above can be implemented either using logic gates, application specific chips, firmware, as well as other hardware forms.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions described above are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A multi-radio device, comprising:
a controller configured to be coupled to a radio;
wherein the controller is configured to receive a request to communicate a signal with an initial communication priority from the radio;
wherein the controller is configured to, adjust the initial communication priority by a first offset;
wherein if an accumulated medium airtime for the radio in a predetermined time period exceeds a preset threshold, then the controller is configured to decrement the first offset; and
wherein the accumulated medium airtime includes a total time the radio is granted to communicate the signal and any other signals.

2. The device of claim 1:
wherein the radio is configured to set the initial communication priority based on a traffic type of the signal.

3. The device of claim 2:
wherein the traffic type is at least one of: real-time two-way voice data, audio recordings, real-time two-way video, video recordings, photos, images, device control, sensor data, electronic payment, and text.

4. The device of claim 1:
wherein the first offset for the radio is based on a number of prior requests to communicate that were granted, denied, or aborted within a predetermined time period.

5. The device of claim 4:
wherein if the number of prior requests that were granted and finished in the predetermined time period exceeds a preset threshold, then the controller is configured to decrement the first offset.

6. The device of claim 4:
wherein if the number of prior requests that were denied or granted then aborted by in the predetermined time period exceeds a preset threshold, then the controller is configured to increment the first offset.

7. The device of claim 1:
wherein if an accumulated medium airtime in a predetermined time period falls below a preset threshold, then the controller is configured to increment the first offset; and
wherein the accumulated medium airtime includes a total time the radio is granted to communicate the signal and any other signals.

8. The device of claim 1:
wherein the controller is configured to, adjust the initial communication priority by a second offset; and
wherein the controller is configured to increase the second offset in response to the signal being transmitted.

9. The device of claim 8:
wherein the controller is configured to receive from the radio a request to enable or disable the second offset.

10. The device of claim 8:
wherein the controller is configured to enable or disable the second offset during communication of the signal.

11. The device of claim 8:
wherein the controller is configured to separately enable or disable the second offset for either transmitted or received communications.

12. The device of claim 8:
wherein the controller is configured to disable the second offset if a packet error rate (PER) for the signal exceeds a predetermined PER.

13. The device of claim 8:
wherein the signal is a digital signal including a set of data-packets; and
wherein the first offset and the second offset are individually adjusted for each data-packet in the set of data-packets.

14. The device of claim 8:
wherein the controller is further configured to be coupled to a second radio;
wherein the controller is configured to receive a request to communicate a second signal with a second communication priority from the second radio;
wherein the controller is configured to, adjust the second communication priority by a third offset;
wherein the controller is configured to, adjust the second communication priority by a fourth offset; and
wherein the second radio is configured to set the second communication priority based on a second traffic type.

15. The device of claim 1:
wherein the controller is configured to separately enable or disable the first offset.

16. The device of claim 1:
wherein the radio is at least one of: a Wi-Fi radio, a Bluetooth radio, or a personal area network radio.

17. The device of claim 1:
wherein the multi-radio device and the radio are embedded in a single multi-radio chip.

18. Method of enabling a multi-radio device to be operated, comprising:
distributing a set of instructions, stored on a non-transitory, tangible computer readable storage medium, for configuring the multi-radio device;
wherein the multi-radio device includes a priority offset module and a priority escalator module, and is configured to be coupled to a radio;
wherein the instructions include:
receiving a request to communicate a signal with an initial communication priority from the radio;
adjusting the initial communication priority by a first offset with the priority offset module; and
adjusting the initial communication priority by a second offset with the priority escalator module;
wherein if an accumulated medium airtime for the radio in a predetermined time period exceeds a preset threshold, then the priority offset module decrements the first offset; and
wherein the accumulated medium airtime includes a total time the radio is granted to communicate the signal and any other signals.

19. A multi-radio device, comprising:
a controller configured to be coupled to a radio;
wherein the controller is configured to receive a request to communicate a signal with an initial communication priority from the radio;
wherein the controller is configured to, adjust the initial communication priority by a first offset;
wherein if an accumulated medium airtime in a predetermined time period falls below a preset threshold, then the controller is configured to increment the first offset; and
wherein the accumulated medium airtime includes a total time the radio is granted to communicate the signal and any other signals.

\* \* \* \* \*